(12) United States Patent
Xiao et al.

(10) Patent No.: US 11,487,160 B2
(45) Date of Patent: Nov. 1, 2022

(54) LIGHT ADJUSTING GLASS

(71) Applicants: BEIJING BOE SENSOR TECHNOLOGY CO., LTD., Beijing (CN); BOE TECHNOLOGY GROUP CO., LTD., Beijing (CN)

(72) Inventors: Yuelei Xiao, Beijing (CN); Yue Li, Beijing (CN); Xiaojuan Wu, Beijing (CN); Nan Zhao, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/251,636

(22) PCT Filed: May 9, 2020

(86) PCT No.: PCT/CN2020/089371
§ 371 (c)(1),
(2) Date: Dec. 11, 2020

(87) PCT Pub. No.: WO2020/238590
PCT Pub. Date: Dec. 3, 2020

(65) Prior Publication Data
US 2021/0247636 A1    Aug. 12, 2021

(30) Foreign Application Priority Data
May 24, 2019 (CN) .......................... 201910441506.9

(51) Int. Cl.
*G02F 1/1337* (2006.01)
*G02F 1/1339* (2006.01)
(Continued)

(52) U.S. Cl.
CPC .......... *G02F 1/1337* (2013.01); *G02F 1/1347* (2013.01); *G02F 1/13394* (2013.01);
(Continued)

(58) Field of Classification Search
CPC ......... G02F 1/133311; G02F 1/133331; G02F 1/1345; G02F 1/1347; G02F 1/13737; G02F 1/13725; G02F 2202/04; G02F 2202/043
See application file for complete search history.

(56) References Cited

U.S. PATENT DOCUMENTS

| | | | |
|---|---|---|---|
| 4,431,270 A * | 2/1984 | Funada | G02F 1/1345 349/149 |
| 2010/0296027 A1* | 11/2010 | Matsuhira | G02F 1/133308 349/96 |
| 2017/0285430 A1* | 10/2017 | Hu | G02F 1/1343 |

FOREIGN PATENT DOCUMENTS

| | | |
|---|---|---|
| CN | 105652549 A | 6/2016 |
| CN | 108463768 A | 8/2018 |

(Continued)

*Primary Examiner* — Jessica M Merlin
(74) *Attorney, Agent, or Firm* — Nath, Goldberg & Meyer; Joshua B. Goldberg

(57) ABSTRACT

The present disclosure provides a light adjusting glass, including a light transmitting substrate and a light adjusting functional layer, where the light transmitting substrate includes a first substrate and a second substrate which are disposed opposite to each other, the light adjusting functional layer is disposed between the first substrate and the second substrate, and the light adjusting functional layer includes at least two liquid crystal cells; the liquid crystal cells are disposed in a laminated mode, and each of the liquid crystal cells has a liquid crystal layer including dye liquid crystal.

11 Claims, 4 Drawing Sheets

(51) Int. Cl.
*G02F 1/1343* (2006.01)
*G02F 1/137* (2006.01)
*G02F 1/1347* (2006.01)

(52) U.S. Cl.
CPC ...... *G02F 1/13725* (2013.01); *G02F 1/13737* (2013.01); *G02F 1/134309* (2013.01); *G02F 2202/04* (2013.01)

(56) References Cited

FOREIGN PATENT DOCUMENTS

| | | | |
|---|---|---|---|
| CN | 209640654 U | | 11/2019 |
| CN | 210488184 U | | 5/2020 |
| JP | 2013007935 A | | 1/2013 |
| JP | 2017021097 A | * | 1/2017 |
| JP | 2017021097 A | | 1/2017 |

* cited by examiner

LIGHT ADJUSTING GLASS

CROSS-REFERENCE TO RELATED APPLICATIONS

This is a National Phase Application filed under 35 U.S.C. 371 as a national stage of PCT/CN2020/089371, filed May 9, 2020, an application claiming the benefit of Chinese Application No. 201910441506.9, filed May 24, 2019, the content of each of which is hereby incorporated by reference in its entirety.

TECHNICAL FIELD

The present disclosure relates to the technical field of intelligent glass, and in particular, relates to a light adjusting glass.

BACKGROUND

A light adjusting glass generally adopts a PDLC (polymer dispersed liquid crystal) light adjusting film or an EC (electro-chromic) technology. Under a condition of no external voltage, optical axes of liquid crystal particles in the PDLC light adjusting film are randomly oriented and present a disordered state, an effective refractive index n0 of the liquid crystal particles is not matched with a refractive index np of a matrix polymer of the PDLC light adjusting film, light incident to the PDLC light adjusting film would be strongly scattered, and the PDLC light adjusting film is opaque or semitransparent; under a condition of an external voltage being applied, the optical axes of the liquid crystal particles in the PDLC light adjusting film are vertical to a surface of the PDLC light adjusting film, namely, the optical axes are oriented in consistent with a direction of an electric field formed by the external voltage, the refractive index of the liquid crystal particles is substantially matched with the refractive index of the matrix polymer of the PDLC light adjusting film, no obvious interface exists in the PDLC light adjusting film, and the PDLC light adjusting film presents as a substantially uniform medium, so that light incident to the PDLC light adjusting film would not be scattered, and the PDLC light adjusting film is transparent. Therefore, the PDLC light adjusting film has optical switching characteristics. However, the PDLC light adjusting film can only switch between transparency and haze, and cannot block light or heat; in addition, a fluid of polymer dispersed liquid crystal has a relatively high viscosity, and thus is not applicable to a liquid crystal one drop filling (ODF) process. An electro-chromic light adjusting glass generally has problems of slow response speed, high requirements on uniformity of a thickness of an electrode film layer and the like.

SUMMARY

The present disclosure provides a light adjusting glass, including a light transmitting substrate and a light adjusting functional layer, where the light transmitting substrate includes a first substrate and a second substrate which are disposed opposite to each other, the light adjusting functional layer is disposed between the first substrate and the second substrate, and the light adjusting functional layer includes at least two liquid crystal cells; and the liquid crystal cells are disposed in a laminated mode; and each of the liquid crystal cells has a liquid crystal layer including dye liquid crystal.

In some implementations, the light adjusting functional layer includes a first liquid crystal cell and a second liquid crystal cell, the first liquid crystal cell includes a first base and a second base which are disposed opposite to each other, a first alignment layer disposed on a side of the first base proximal to the second base, a second alignment layer disposed on a side of the second base proximal to the first base, and the liquid crystal layer interposed between the first alignment layer and the second alignment layer, the second liquid crystal cell includes a third base and a fourth base which are disposed opposite to each other, a third alignment layer disposed on a side of the third base proximal to the fourth base, a fourth alignment layer disposed on a side of the fourth base proximal to the third base, and the liquid crystal layer interposed between the third alignment layer and the fourth alignment layer, the first alignment layer and the second alignment layer of the first liquid crystal cell have alignment directions parallel to each other, the third alignment layer and the fourth alignment layer of the second liquid crystal cell have alignment directions parallel to each other, the alignment direction of the first alignment layer in the first liquid crystal cell is perpendicular to the alignment direction of the third alignment layer in the second liquid crystal cell.

In some implementations, a first electrode layer is disposed between the first base and the first alignment layer of the first liquid crystal cell, a second electrode layer is disposed between the second base and the second alignment layer of the first liquid crystal cell, a third electrode layer is disposed between the third base and the third alignment layer of the second liquid crystal cell, and a fourth electrode layer is disposed between the fourth base and the fourth alignment layer of the second liquid crystal cell.

In some implementations, a first connection electrode and a second connection electrode are further provided on the first base, the first connection electrode is directly coupled to the first electrode layer, and is coupled to a first signal connection line, the second connection electrode is coupled to the second electrode layer through a first conductive structure, and is coupled to a second signal connection line, a third connection electrode and a fourth connection electrode are further disposed on the third base, the third connection electrode is directly coupled to the third electrode layer, and is coupled to a third signal connection line, the fourth connection electrode is coupled to the fourth electrode layer through a second conductive structure, and is coupled to a fourth signal connection line.

In some implementations, the first conductive structure includes silver paste or gold, and the second conductive structure includes silver paste or gold.

In some implementations, at least one of the first electrode layer and the second electrode layer in the first liquid crystal cell includes a plurality of electrode blocks, and each of the electrode blocks is controlled by a separate driving circuit.

In some implementations, at least one of the third electrode layer and the fourth electrode layer in the second liquid crystal cell includes a plurality of electrode blocks, and each of the electrode blocks is controlled by a separate driving circuit.

In some implementations, the second base in the first liquid crystal cell is multiplexed into the third base in the second liquid crystal cell.

In some implementations, a first spacer is further disposed between the first alignment layer and the second alignment layer of the first liquid crystal cell, and a second spacer is further disposed between the third alignment layer and the fourth alignment layer of the second liquid crystal cell, the first spacer maintains a cell thickness of the first liquid crystal cell, and the second spacer maintains a cell thickness of the second liquid crystal cell.

In some implementations, the first substrate is bonded to the first base of the first liquid crystal cell by a first adhesive layer, and the second base of the first liquid crystal cell is bonded to the third base of the second liquid crystal cell by a second adhesive layer.

In some implementations, a material of each of the first adhesive layer and the second adhesive layer includes optically clear adhesive conductive paste or plastic resin glue.

In some implementations, each of the first substrate and the second substrate is a tempered glass.

In some implementations, the light adjusting glass is used as a vehicle window glass.

In some implementations, the dye liquid crystal includes color dye liquid crystal.

DESCRIPTION OF EMBODIMENTS

In order to make technical solutions of the present disclosure be better understood by a person skilled in the art, the technical solutions of the present disclosure are described in further detail below with reference to the accompanying drawings and the detailed description.

An embodiment of the present disclosure provides a light adjusting glass, including a light transmitting substrate and a light adjusting functional layer. The light transmitting substrate may include a first substrate and a second substrate which are disposed opposite to each other. The light adjusting functional layer may be disposed between the first substrate and the second substrate and configured to adjust a transmittance of light. Specifically, in the embodiment, the light adjusting functional layer includes at least two liquid crystal cells, the liquid crystal cells are disposed in a laminated mode, each of the liquid crystal cells has a liquid crystal layer including dye liquid crystal, that is, a material of the liquid crystal layer includes liquid crystal molecules and doped dichroic dye.

The light adjusting glass of the embodiment includes multiple liquid crystal cells disposed between the first substrate and the second substrate, and the liquid crystal layer in each of the liquid crystal cells includes dye liquid crystal formed by doping dichroic dye into aligned liquid crystal, the dichroic dye has different absorption rates for polarized light in directions vertical and parallel to a molecule axis thereof, absorbs polarized light in a certain direction, and polarized light in a direction vertical to the certain direction will transmit. Thus, taking vertical alignment (VA) type dye liquid crystal as an example, when no electric field is applied, the dye and the liquid crystal are aligned vertically to the substrate, and natural light is perpendicular to a light-absorbing direction of the dye, so the natural light is substantially not absorbed; when an electric field is applied, the dye and the liquid crystal are aligned parallel to the substrate, and when the natural light passes through, light parallel to the light-absorbing direction of the dye is absorbed.

In order to make a structure of the light adjusting glass more clear in the embodiment of the present disclosure, the light adjusting glass is described below by taking the light adjusting glass including two liquid crystal cells (the first liquid crystal cell and the second liquid crystal cell) as an example.

Figure 1:
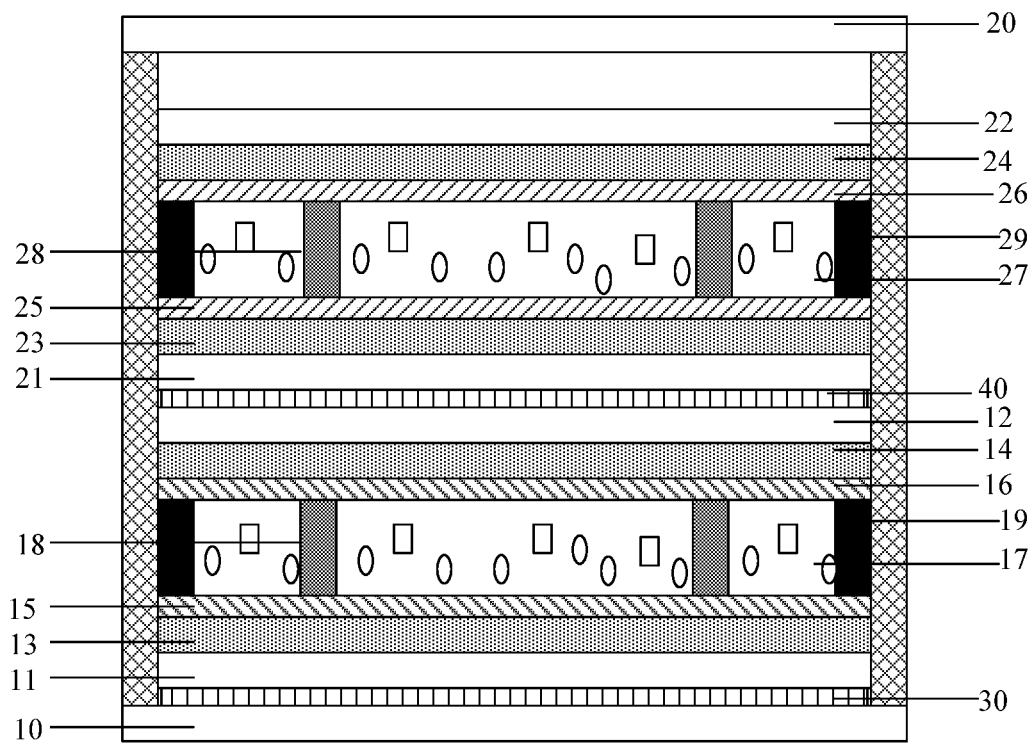
FIG. 1 is a schematic structural diagram of a light adjusting glass in a bright state according to an embodiment of the present disclosure.
Figure 2:
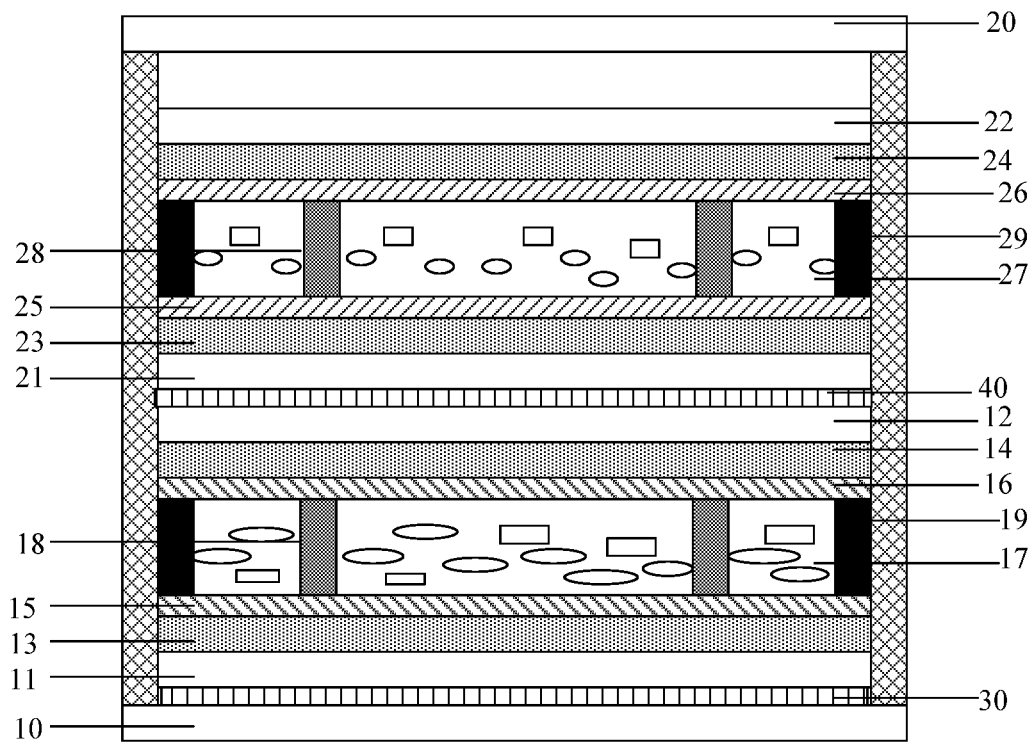
FIG. 2 is a schematic structural diagram of a light adjusting glass in a dark state according to an embodiment of the present disclosure.

As shown in FIGS. 1 and 2, an embodiment of the present disclosure provides a light adjusting glass including a light transmitting substrate and a light adjusting functional layer. The light transmitting substrate includes a first substrate 10 and a second substrate 20 which are disposed opposite to each other. The light adjusting functional layer includes a first liquid crystal cell and a second liquid crystal cell which are disposed in a laminated mode. The light adjusting functional layer is disposed between the first substrate 10 and the second substrate 20. The first liquid crystal cell includes a first base 11 and a second base 12 which are disposed opposite to each other, a first electrode layer 13 and a first alignment layer 15 sequentially disposed on a side of the first base 11 proximal to the second base 12, a second electrode layer 14 and a second alignment layer 16 sequentially disposed on a side of the second base 12 proximal to the first base 11, and a first liquid crystal layer 17 disposed between the first alignment layer 15 and the second alignment layer 16. The second liquid crystal cell includes a third base 21 and a fourth base 22 which are disposed opposite to each other, a third electrode layer 23 and a third alignment layer 25 sequentially disposed on a side of the third base 21 proximal to the fourth base 22, a fourth electrode layer 24 and a fourth alignment layer 26 sequentially disposed on a side of the fourth base 22 proximal to the third base 21, and a second liquid crystal layer 27 disposed between the third alignment layer 25 and the fourth alignment layer 26. The first alignment layer 15 and the second alignment layer 16 of the first liquid crystal cell have a same alignment direction; the third alignment layer 25 and the fourth alignment layer 26 of the second liquid crystal cell have a same alignment direction; the alignment direction of the first alignment layer 15 of the first liquid crystal cell is perpendicular to the alignment direction of the third alignment layer 25 of the second liquid crystal cell. The first liquid crystal layer 17 and the second liquid crystal layer 27 each include dye liquid crystal, i.e., include liquid crystal molecules and doped dichroic dye. The liquid crystal molecules may be negative liquid crystal molecules, but are not limited to the negative liquid crystal molecules.

In the embodiment of the present disclosure, an example, in which each of the first electrode layer, the second electrode layer, the third electrode layer, and the fourth electrode layer includes a plate-shaped electrode, is described. That is, a VA-type electric field is formed between the first electrode layer and the second electrode layer when a voltage is applied thereto, and a VA-type electric field is formed between the third electrode layer and the fourth electrode layer when a voltage is applied thereto. Certainly, when the liquid crystal molecules are positive liquid crystal molecules, a TN type electric field is formed between the first electrode layer and the second electrode layer when a voltage is applied thereto, and a TN type electric field is formed between the third electrode layer and the fourth electrode layer when a voltage is applied thereto.

In addition, in the embodiment of the present disclosure, the first electrode layer and the second electrode layer of the first liquid crystal cell may be both disposed on the first base, and the third electrode layer and the fourth electrode layer of the second liquid crystal cell may be both disposed on the third base, in such case, the first electrode layer and the second electrode layer are sequentially disposed in a direction away from the first base, the third electrode layer and the fourth electrode layer are sequentially disposed in a direction away from the third base, the first electrode layer and the third electrode layer may adopt plate-shaped electrodes, the second electrode layer and the fourth electrode layer may adopt slit electrodes, and when a voltage is applied, an ITS (Fringe Field Switching) type electric field or an ADS (Advanced-Super Dimensional Switching) type electric field is formed between the first electrode layer and the second electrode layer, and an FFS type electric field or an ADS type electric field is formed between the third electrode layer and the fourth electrode layer. Certainly, the first liquid crystal cell may include only the first electrode layer on the first base but not include the second electrode layer, and the second liquid crystal cell may include only the third electrode layer on the third base but not include the fourth electrode layer, in such case, the first electrode layer includes a first electrode and a second electrode which are disposed at an interval, the third electrode layer includes a third electrode and a fourth electrode which are disposed at an interval, and when a voltage is applied, an IPS type electric field is formed between the first electrode and the second electrode, and an IPS type electric field is formed between the third electrode and the fourth electrode.

In the light adjusting glass of the embodiment of the present disclosure, the first alignment layer 15 and the second alignment layer 16 of the first liquid crystal cell have alignment directions parallel to each other, i.e., pretilt angles of liquid crystal molecules with respect to the first alignment layer 15 and the second alignment layer 16 are the same; the third alignment layer 25 and the fourth alignment layer 26 of the second liquid crystal cell have alignment directions parallel to each other, i.e., pretilt angles of liquid crystal molecules with respect to the third alignment layer 25 and the fourth alignment layer 26 are the same; the alignment direction of the first alignment layer 15 of the first liquid crystal cell is perpendicular to the alignment direction of the third alignment layer 25 of the second liquid crystal cell, i.e., the pretilt angles of the liquid crystal molecules with respect to the first alignment layer 15 and the third alignment layer 25 are different by 90°. Therefore, when no electricity is applied, the negative liquid crystal molecules in the first liquid crystal cell are subjected to an anchoring force of a PI (polyimide) layer (i.e., alignment layer), the liquid crystal molecules are perpendicular to the first base 11 and the second base 12, the dichroic dye is perpendicular to the first base 11 and the second base 12 along with the liquid crystal molecules, the negative liquid crystal molecules in the second liquid crystal cell are subjected to an anchoring force of a PI (polyimide) layer (i.e., alignment layer), the liquid crystal molecules are perpendicular to the third base 21 and the fourth base 22, the dichroic dye is perpendicular to the third base 21 and the fourth base 22 along with the liquid crystal molecules, less light is absorbed by the dichroic dye, and the light adjusting glass is in a bright state, as shown in FIG. 1; when an electric field is applied, the negative liquid crystal molecules in the first liquid crystal cell are parallel to the first base 11 and the second base 12 under an action of force of the electric field, the negative liquid crystal molecules in the second liquid crystal cell are parallel to the third base 21 and the fourth base 22 under an action of force of the electric field, pretilt angles of the liquid crystal molecules in the first liquid crystal cell with respect to the first alignment layer and the second alignment layer are the same, i.e., alignment directions of the first alignment layer and the second alignment layer are parallel, pretilt angles of the liquid crystal molecules in the second liquid crystal cell with respect to the third alignment layer and the fourth alignment layer are the same, i.e., alignment directions of the third alignment layer and the fourth alignment layer are parallel, and the alignment direction of the first alignment layer 15 in the first liquid crystal cell is perpendicular to the alignment direction of the third alignment layer 25 in the second liquid crystal cell, in such case, absorbable light directions of the dye liquid crystal in the first liquid crystal cell and the second liquid crystal are orthogonal to each other, according to the Malus law, incident light is substantially fully absorbed by the light adjusting glass, and thus the light adjusting glass presents a dark state, as shown in FIG. 2. The light adjusting glass provided by the embodiment of the present disclosure has advantages of fast response, low transmittance in the dark state and the like.

In the embodiment of the present disclosure, the first base 11 in the first liquid crystal cell and the first substrate 10 of the light transmitting substrate may be bonded together by a first adhesive layer 30; the first adhesive layer 30 may specifically include optically clear adhesive (OCA) conductive paste or plastic resin paste such as PVB (polyvinyl butyral) paste which can prevent ultraviolet rays. Certainly, the first adhesive layer 30 is not limited to the above two materials, and other transparent materials having adhesive force may be used. The second base 12 of the first liquid crystal cell and the third base 21 of the second liquid crystal cell may be bonded together by a second adhesive layer 40, and the second adhesive layer 40 may be made of the same material as the first adhesive layer 30.

A first spacer 18 may be disposed between the first alignment layer 15 and the second alignment layer 16 of the first liquid crystal cell, a second spacer 28 may be disposed between the third alignment layer 25 and the fourth alignment layer 26 of the second liquid crystal cell, materials of the first spacer 18 and the second spacer 28 may be resin materials, and thicknesses (i.e., dimensions in directions parallel to the respective alignment layers) of the first spacer 18 and the second spacer 28 may be between 10 μm and 30 μm. According to different thicknesses of a selected spacer, the light transmittance of the light adjusting glass in the dark state is between 0.5% and 15%, and the light transmittance of the light adjusting glass in the bright state is between 38% and 76%.

Figure 3:
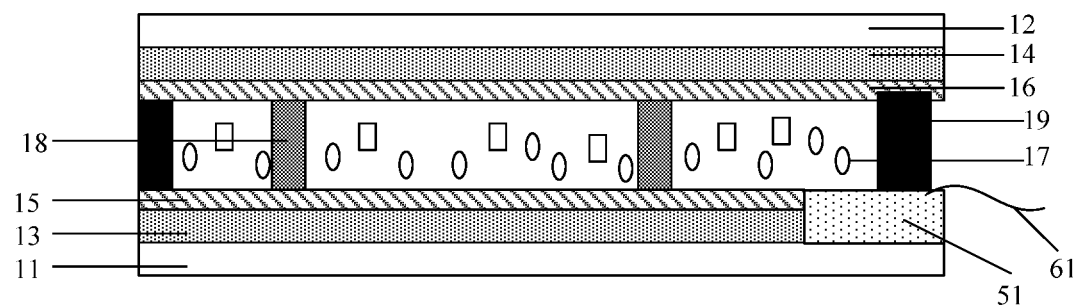
FIG. 3 is a schematic diagram of signal connection of a first electrode layer in a first liquid crystal cell of a light adjusting glass according to an embodiment of the present disclosure.
Figure 4:
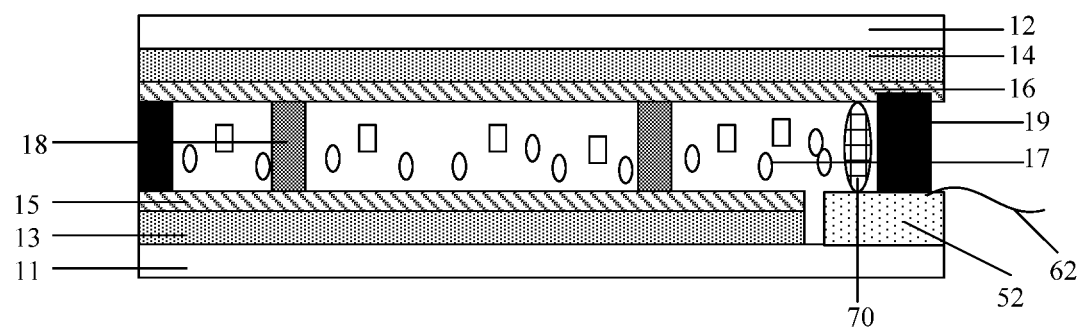
FIG. 4 is a schematic diagram of signal connection of a second electrode layer in a first liquid crystal cell of a light adjusting glass according to an embodiment of the present disclosure.

A first connection electrode 51 and a second connection electrode 52 may be further disposed on the first base 11 of the first liquid crystal cell, the first connection electrode 51 may be directly coupled to the first electrode layer 13 on the first base 11 and further coupled to a first signal connection line 61, as shown in FIG. 3, and the second connection electrode 52 may be coupled to the second electrode layer 14 on the second base 12 through a first conductive structure 70 and further coupled to a second signal connection line 62, as shown in FIG. 4. The first signal connection line 61 and the second signal connection line 62 may introduce signals by means of solder or FPC (flexible printed circuit). The first conductive structure 70 may include silver paste or Au (gold).

Figure 5:
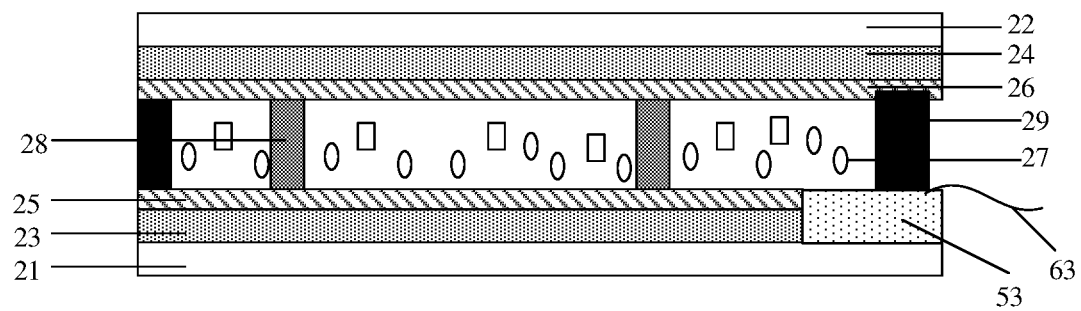
FIG. 5 is a schematic diagram of signal connection of a third electrode layer in a second liquid crystal cell of a light adjusting glass according to an embodiment of the present disclosure.
Figure 6:
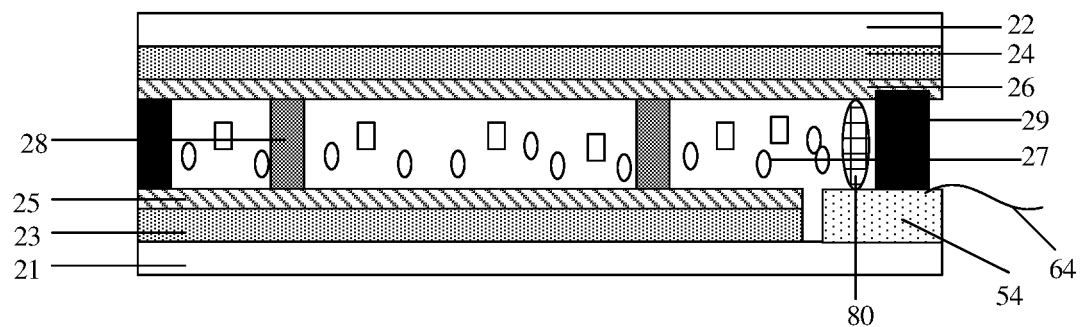
FIG. 6 is a schematic diagram of signal connection of a fourth electrode layer in a second liquid crystal cell of a light adjusting glass according to an embodiment of the present disclosure.

Similarly, as shown in FIG. 5 and FIG. 6, a third connection electrode 53 directly coupled to the third electrode layer 23 and a fourth connection electrode 54 coupled to the fourth electrode layer 24 through a second conductive structure 80 may be further provided on the third base 21 of the second liquid crystal cell, the third connection electrode 53 may be coupled to a third signal connection line 63, the fourth connection electrode 54 may be coupled to a fourth signal connection line 64, the third signal connection line 63 and the fourth signal connection line 64 may introduce signals by means of solder or FPC (flexible Printed circuit), and the second conductive structure 80 may include silver paste or Au (gold).

It should be understood that the first signal connection line 61, the second signal connection line 62, the third signal connection line 63, and the fourth signal connection line 64 may introduce signals in a same manner or in different manners, and the first conductive structure 70 and the second conductive structure 80 may include a same material or different materials, which may be selected as needed, and the embodiment of the present disclosure is not limited thereto.

In addition, the first liquid crystal cell may further include a first sealant 19 for sealing the first liquid crystal cell, and the second liquid crystal cell may, further include a second sealant 29 for sealing the second liquid crystal cell.

Figure 7:
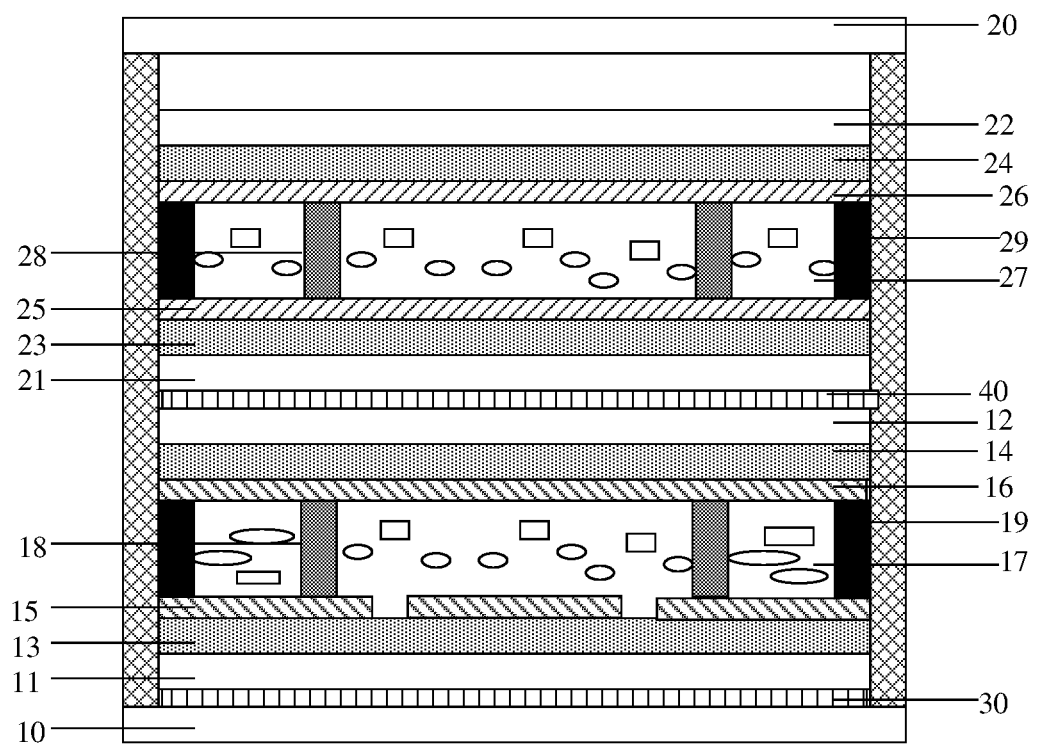
FIG. 7 is a schematic structural diagram of a light adjusting glass in a state; in which a partial area is in a bright state and a partial area is in a dark state, according to an embodiment of the present disclosure.

The light adjusting glass provided by the embodiment of the present disclosure can realize the bright state in a partial area and the dark state in another partial area. For example, at least one of the first electrode layer and the second electrode layer in the first liquid crystal cell may include a plurality of electrode blocks which are respectively controlled by separate driving circuits, or at least one of the third electrode layer and the fourth electrode layer in the second liquid crystal cell may include a plurality of electrode blocks which are respectively controlled by separate driving circuits. Specifically, as shown in FIG. 7, if the first electrode layer 13 in the first liquid crystal cell includes a plurality of electrode blocks, that is, the electrode blocks divide the first liquid crystal cell into a plurality of areas, and the electrode blocks are controlled by separate driving circuits, then different voltages may be applied to the different electrode blocks to control the different electrode blocks, so as to generate different electric fields between the different electrode blocks and the second electrode layer 14 disposed opposite to the electrode blocks, so that the liquid crystal molecules in the liquid crystal layer corresponding to the different electrode blocks are deflected different angles, thereby light transmittances of the areas of the first liquid crystal cell corresponding to the different electrode blocks are different, i.e., light transmittances of different areas of the light adjusting glass are different. Alternatively, the second electrode layer 14 in the first liquid crystal cell may include a plurality of electrode blocks, and in such case, different voltages may be applied to different electrode blocks, so that different electric fields are generated between the different electrode blocks and the first electrode layer 13 disposed opposite to the electrode blocks, so that light transmittances in different areas of the light adjusting glass are different Certainly, the first electrode layer 13 and the second electrode layer 14 in the first liquid crystal cell may each include a plurality of electrode blocks, and it should be noted that the electrode blocks in the first electrode layer 13 and the electrode blocks in the second electrode layer 14 at least partially overlap, and in such case, according to the above manner, light transmittances of different areas of the light adjusting glass may also be different.

Figure 8:
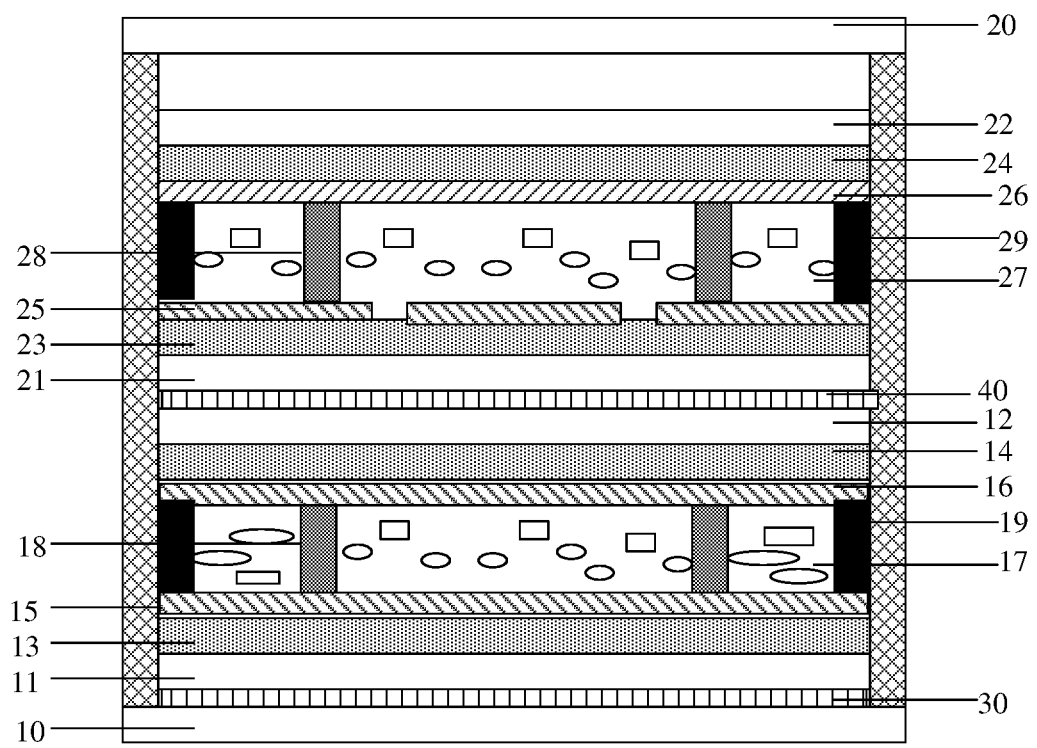
FIG. 8 is a schematic structural diagram of a light adjusting glass in a state, in which a partial area is in a bright state and a partial area is in a dark state; according to an embodiment of the present disclosure.

Similarly, as shown in FIG. 8, if the third electrode layer 23 in the second liquid crystal cell includes a plurality of electrode blocks, that is, the electrode blocks divide the first liquid crystal cell into a plurality of area, and the electrode blocks are respectively controlled by separate driving circuits, then different voltages may be applied to the different electrode blocks to control the different electrode blocks, so as to generate different electric fields between the different electrode blocks and the fourth electrode layer 24 disposed opposite to the electrode blocks, so that the liquid crystal molecules in the liquid crystal layer corresponding to the different electrode blocks are deflected different angles, thereby light transmittances of the areas of the first liquid crystal cell corresponding to the different electrode blocks are different, i.e., light transmittances of different areas of the light adjusting glass are different. Alternatively, the fourth electrode layer 24 in the second liquid crystal cell may include a plurality of electrode blocks, and in such case, different voltages may be applied to different electrode blocks to generate different electric fields between the different electrode blocks and the third electrode layer 23 opposite to the electrode blocks, so that light transmittances in different areas of the light adjusting glass are different. Certainly, the third electrode layer 23 and the fourth electrode layer 24 in the second liquid crystal cell may each include a plurality of electrode blocks, and in such case; it should be noted that the electrode blocks in the third electrode layer 23 and the electrode blocks in the fourth electrode layers 24 at least partially overlap, and in such case, according to the above manner, light transmittances of different areas of the light adjusting glass may also be different.

Certainly, in the embodiment of the present disclosure, at least one of the first electrode layer and the second electrode layer in the first liquid crystal cell includes a plurality of electrode blocks which are controlled by separate driving circuits, and at least one of the third electrode layer and the fourth electrode layer in the second liquid crystal cell includes a plurality of electrode blocks, in such case, for each of the first liquid crystal cell and the second liquid crystal cell, light transmittances of different areas are different, and through a cooperation of the first liquid crystal cell and the second liquid crystal cell, more precise control of the light transmittances of different areas of the light adjusting glass can be achieved.

The light adjusting glass in the embodiment of the present disclosure is particularly suitable for vehicle glass. Each of the first substrate and the second substrate of the light transmitting substrates may be a tempered glass.

Certainly, in the embodiment of the present disclosure, liquid crystal layers in the first liquid crystal cell and the second liquid crystal cell may adopt color dye liquid crystal, so that the light adjusting glass may have a color.

Figure 9:
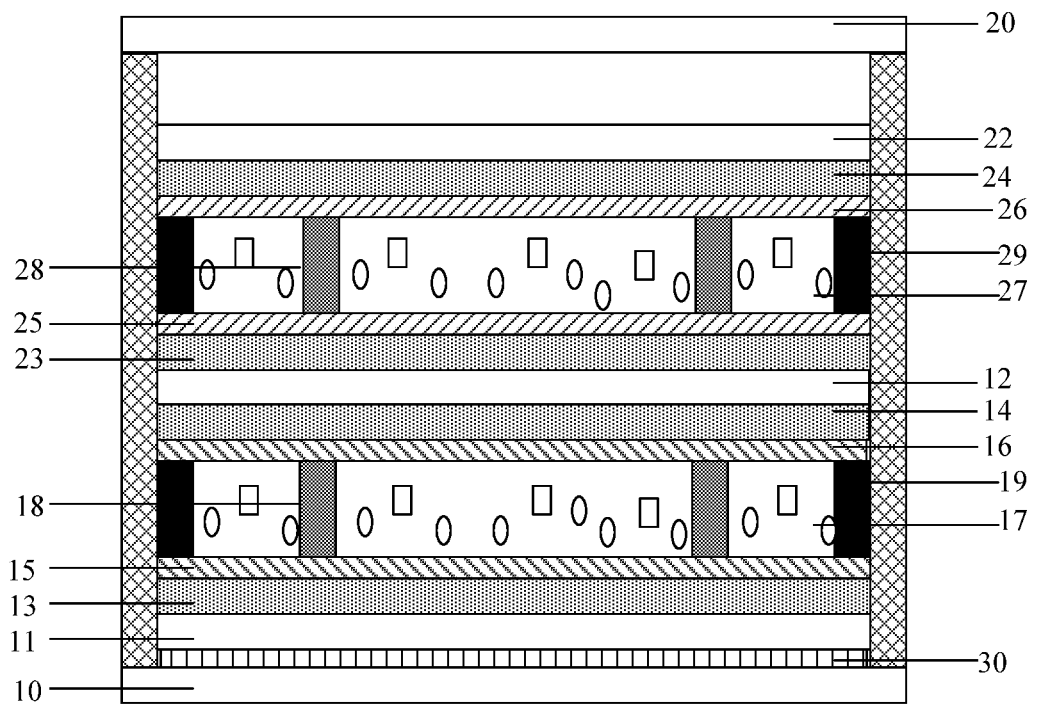
FIG. 9 is a schematic structural diagram of a light adjusting glass according to an embodiment of the present disclosure.

An embodiment of the present disclosure further provides a light adjusting glass having substantially the same structure as the light adjusting glass in the above embodiment, except that the second base in the first liquid crystal cell is common to the third base in the second liquid crystal cell. As shown in FIG. 9, the second base 12 in the first liquid crystal cell simultaneously serves as the third base 21 in the second liquid crystal cell, and in such case, the third electrode layer 23 and the third alignment layer 25 in the second liquid crystal cell are disposed on a side of the second base 12 of the first liquid crystal cell facing away from the liquid crystal layer 17 of the first liquid crystal cell. It can be seen that, compared with the light adjusting glass in the above embodiment, the light adjusting glass in this embodiment omits the second adhesive layer 40 bonding the third base 21 of the second liquid crystal cell to the second base 12 of the first liquid crystal cell, so that the thickness of the light adjusting glass can be reduced, and the cost can be reduced.

For remaining structures of the light adjusting glass in this embodiment, the same structures in the above embodiment may be adopted, and therefore details are not repeated in this embodiment.

It will be understood that the above embodiments are merely exemplary embodiments employed to illustrate the principles of the present disclosure, and the present disclosure is not limited thereto. It will be apparent to those skilled in the art that various changes and modifications may be made therein without departing from the spirit and scope of the present disclosure, and these changes and modifications are to be considered within the scope of the present disclosure.

The invention claimed is:

1. A light adjusting glass, comprising a light transmitting substrate and a light adjusting functional layer, wherein the light transmitting substrate comprises a first substrate and a second substrate which are disposed opposite to each other, the light adjusting functional layer is disposed between the first substrate and the second substrate, and the light adjusting functional layer comprises at least two liquid crystal cells; the liquid crystal cells are disposed in a laminated mode, and each of the liquid crystal cells comprises a liquid crystal layer comprising dye liquid crystal, wherein the light adjusting functional layer comprises a first liquid crystal cell and a second liquid crystal cell, the first liquid crystal cell comprises a first base and a second base which are disposed opposite to each other, a first alignment layer disposed on a side of the first base proximal to the second base, a second alignment layer disposed on a side of the second base proximal to the first base. and the liquid crystal layer interposed between the first alignment layer and the second alignment layer, the second liquid crystal cell comprises a third base and a fourth base which are disposed opposite to each other, a third alignment layer disposed on a side of the third base proximal to the fourth base, a fourth alignment layer disposed on a side of the fourth base proximal to the third base, and the liquid crystal layer interposed between the third alignment layer and the fourth alignment layer, alignment directions of the first alignment layer and the second alignment layer of the first liquid crystal cell are parallel, alignment directions of the third alignment layer and the fourth alignment layer of the second liquid crystal cell are parallel, and the alignment direction of the first alignment layer in the first liquid crystal cell is perpendicular to she alignment direction of the third alignment layer in the second liquid crystal, wherein a first electrode layer is disposed between the first base and the first alignment layer of the first liquid crystal cell, a second electrode layer is disposed between the second base and the second alignment layer of the first liquid crystal cell, a third electrode layer is disposed between the third base and the third alignment layer of the second liquid crystal cell, and a fourth electrode layer is disposed between the fourth base and the fourth alignment layer of the second liquid crystal cell, and wherein a first connection electrode and a second connection electrode are further provided on the first base, the first connection electrode is directly coupled to the first electrode layer and further con pied to a first signal connection line, the second connection electrode is coupled to the second electrode layer through a first conductive structure and further coupled a second signal connection line, a third connection electrode and a fourth connection electrode are further provided on the third base, the third connection electrode is directly coupled to the third electrode layer and further coupled to a third signal connection line, and the fourth connection electrode is coupled to the fourth electrode layer through a second conductive structure and further coupled to a fourth signal connection line.

2. The light adjusting glass of claim 1, wherein the first conductive structure comprises silver paste or gold and the second conductive structure comprises silver paste or gold.

3. The light adjusting glass of claim 1, wherein at least one of the first electrode layer and the second electrode layer in the first liquid crystal cell comprises a plurality of electrode blocks which are respectively controlled by separate driving circuits.

4. The light adjusting glass of claim 1, wherein at least one of the third electrode layer and the fourth electrode layer in the second liquid crystal cell comprises a plurality of electrode blocks which are respectively controlled by separate driving circuits.

5. The light adjusting glass of claim 1, wherein the second base in the first liquid crystal cell is multiplexed as the third base in the second liquid crystal cell.

6. The light adjusting glass of claim 1, wherein a first spacer is further disposed between the first alignment layer and the second alignment layer of the first liquid crystal cell, and a second spacer is further disposed between the third alignment layer and the fourth alignment layer of the second liquid crystal cell, the first spacer maintains a cell thickness of the first liquid crystal cell, and the second spacer maintains a cell thickness of the second liquid crystal cell.

7. The light adjusting glass of claim 1, wherein the first substrate is bonded to the first base of the first liquid crystal cell by a first adhesive layer, and the second base of the first liquid crystal cell is bonded to the third base of the second liquid crystal cell by a second adhesive layer.

8. The light adjusting glass of claim 7, wherein materials of the first adhesive layer and the second adhesive layer each comprise optically clear adhesive conductive paste or plastic resin paste.

9. The light adjusting glass of claim 1, wherein each of the first substrate and the second substrate is a tempered glass.

10. The light adjusting glass of claim 1, wherein the light adjusting glass is used as a window glass.

11. The light adjusting glass of claim 1, wherein the dye liquid crystal comprises color dye liquid crystal.

* * * * *